United States Patent [19]

Heald, Jr.

[11] 4,149,720
[45] * Apr. 17, 1979

[54] BALL AND METHOD OF MAKING SAME

[75] Inventor: Jesse H. Heald, Jr., Tullahoma, Tenn.

[73] Assignee: Lannom Manufacturing Company, Inc., Tullahoma, Tenn.

[*] Notice: The portion of the term of this patent subsequent to Aug. 24, 1993, has been disclaimed.

[21] Appl. No.: 830,012

[22] Filed: Sep. 1, 1977

Related U.S. Application Data

[60] Division of Ser. No. 624,979, Oct. 22, 1975, abandoned, which is a continuation-in-part of Ser. No. 487,203, Jul. 10, 1974, abandoned.

[51] Int. Cl.² .............................................. A63B 37/00
[52] U.S. Cl. .............................. 273/60 R; 273/DIG. 8
[58] Field of Search .............. 273/58 BA, 58 A, 60 B, 273/60 R, 60 A, DIG. 8, 218, DIG. 20, 58 J, 58 G, 58 H, 26 R

[56] References Cited

U.S. PATENT DOCUMENTS

| | | | |
|---|---|---|---|
| 1,803,121 | 4/1931 | Meurisse | 273/58 A |
| 2,081,531 | 5/1937 | Fegan | 273/58 A |
| 2,138,004 | 11/1938 | Grau | 273/60 R |
| 2,743,931 | 5/1956 | Pooley et al. | 273/60 B X |
| 3,069,170 | 12/1962 | Dillon | 273/60 B X |
| 3,185,476 | 5/1965 | Fechner | 273/58 BA |
| 3,518,786 | 7/1970 | Holtvoigt | 273/DIG. 8 |
| 3,644,168 | 2/1972 | Bonk et al. | 273/DIG. 8 |
| 3,940,145 | 2/1976 | Gentiluomo | 273/218 |
| 3,976,295 | 8/1976 | Heald | 273/60 R |

*Primary Examiner*—George J. Marlo
*Attorney, Agent, or Firm*—Mason, Fenwick & Lawrence

[57] ABSTRACT

A ball is disclosed formed with a spherical core of polyurethane foam covered with a thin winding of cotton yarn and with a hand stitched outer cover; the ball is formed in a mold by providing a polymeric isocyanate with a mixture of water and a polyol crosslinking catalyst with the ratio between the isocyanate and the mixture of the catalyst and the water being variable to provide a ball of desired weight, resilience and density so that the ball formed by the method can duplicate such characteristics as found in regulation baseballs and softballs, for example.

2 Claims, 6 Drawing Figures

BALL AND METHOD OF MAKING SAME

RELATED APPLICATION

This application is a division of application Ser. No. 624,979 filed Oct. 22, 1975, now abandoned, which is a continuation-in-part of application Ser. No. 487,203 filed July 10, 1974, which is now abandoned.

BACKGROUND OF THE INVENTION

This invention is in the field of balls per se and the fabrication of balls. More specifically, the subject invention is in the field of baseballs and softballs and is particularly directed to a ball construction and method providing either a baseball, softball or similar ball having desired characteristics of appearance, size, weight, rebound capacity and essentially identical to such features of prior conventional or regulation balls, but having uniformity of construction, cost and durability advantages over prior known conventional balls.

The term "regulation baseball" as used herein and by persons in organized baseball refers to a ball which has the physical characteristics provided in Rule 1.09 of the OFFICIAL BASEBALL RULES REVISED EDITION, published by the Commissioner of Baseball, which requires that the ball weigh not less then 5 nor more than 5.25 ounces and that it measure not less than 9 or more than 9.25 inches in circumference and must be made of specified materials; such balls as approved by organized baseball have a rebound capacity of 33% to 35% when dropped from a 20 foot elevation onto a hard surface and have a deformation range of between 0.5 inch and 0.8 inch when subject to 1000 pounds of force. The terms "conventional baseball" and "traditional baseballs" are interchangeable with "regulation baseball" and have the same meaning.

Balls having the appearance of regulation baseballs but not conforming to the ball standards of a regulation baseball are referred to by the trade and sold under the names such as "practice baseballs", "sandlot balls", "toy baseballs" and "carnival baseballs" as distinguished from conventional or regulation baseballs.

The terms "conventional" and "regulation" as used herein and as applied to softballs by persons in organized softball are interchangeable and refer to a ball which meets the standards provided in Rule 3, Sec. 2 of the Official Softball Rules of The International Joint Rules Committee on Softball which requires that the ball be not less than 11⅞ inches or more than 12⅛ inches in circumference and not weigh less than 6¼ ounces (171.19 gm) or more than 7 ounces (198.5 gm) and must be made of specified materials; such balls have a rebound capacity of 20% to 31% when dropped from a twenty foot height onto a hard surface.

Balls having the appearance of conventional softballs but not conforming to the ball standards of organized softball are referred to by the trade and sold under names such as "sandlot softballs" and "practice softballs".

Regulation baseballs are formed with a cork and rubber center over which winding of wool and cotton are provided with the entire assembly being maintained in a handsewn leather cover in the well-known figure eight pattern. The weight of the ball is determined by the density of the separate materials used in the ball and the tension of the wool yarn windings. Normally, the winding of cotton thread merely serves to provide a smooth surface onto which the leather cover is sewn. The weight of the baseball is determined by the density of the separate materials employed in the ball and the tension of the wool windings. Consequently, the ball weight and resilience are related and cannot be controlled or varied independently of each other. The vast majority of baseballs used in organized league play such as in high school, college, professional, youth leagues and the like are formed in this traditional manner.

Softballs commonly employ a construction which includes a core of cork or kapok. The core is wound with cotton or synthetic yarn over which a hand-stitched leather cover in the traditional figure eight pattern is provided. When a cork core is employed, it is normally mixed with a suitable binder before molding to add strength to the finished core portion. The weight of the softball is determined by the weight of the separate materials used and the resiliency is determined primarily by the cork or kapok core. As in the case with the conventional baseball, the weight and resiliency of the ball cannot be controlled independently of each other.

The materials employed in regulation baseballs and softballs are relatively expensive with additional costs resulting from the substantial amount of hand labor required for the fabrication of such balls.

Therefore, it is the primary object of this invention to provide a new and improved ball construction as well as a new and improved method of ball fabrication.

SUMMARY OF THE INVENTION

Achievement of the object of the invention is enabled through the employment of a hollow spherical mold for forming the core of the ball of polyurethane foam produced by the reaction of three separate liquid components in the mold. These components are introduced into the mold in desired ratios to provide desired resiliency and rebound characteristics as well as a desired weight. The components comprise isocyanate and a mixture of a polyol crosslinking catalyst and water. The ratio of the catalyst to the isocyanate determines the degree of polymerization and crosslinking of polymers which in turn determines the resiliency. The blowing agent is the water in the mixture which reacts with the isocyanate to produce carbon dioxide to cause foam expansion of the components during the polymerization process. Once the desired ratio of catalyst to the isocyanate has been determined to produce the desired resilience, the amount of blowing agent is varied to produce the desired density and weight for the particular ball being constructed. Consequently, the resilience and weight are controlled independently of each other.

After formation of the core of the polyurethane foam, the core is then coated with a winding of thin cotton yarn over which a leather or synthetic cover is provided in a conventional manner. For example, if a baseball is being made, a horsehide is hand sewn about the core and the intermediate winding of cotton yarn to provide a resultant ball having the exact same appearance, weight and resilience as a conventional baseball. The intermediate winding of cotton yarn is optional and does not have to be used if desired. Similarly, a ball having the exact same resilience, weight and appearance as any of the various types of conventional softballs can also be provided through employment of the inventive method.

A better understanding of the subject invention will be achieved when the following written description is considered in conjunction with the appended drawings.

DESCRIPTION OF THE PREFERRED EMBODIMENT

Figure 1:
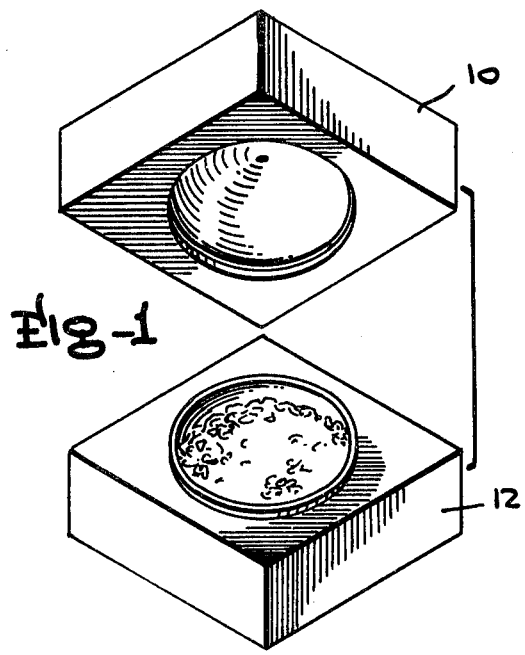
FIG. 1 is an exploded perspective illustrating open mold means employed in practice of the preferred embodiment and also illustrating an initial step in the inventive method.
Figure 2:
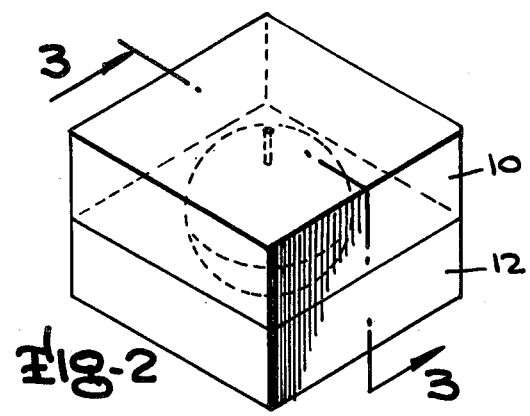
FIG. 2 is a perspective view of the mold means in a closed condition.

Attention is initially invited to FIG. 1 of the drawings which illustrates a mold member comprising an upper mold portion 10 and a lower mold portion 12 which cooperate when placed together in the position illustrated in FIG. 2 to define a shperical cavity 14 which communicates with a vent 20 in the upper mold member 10.

Figure 4:
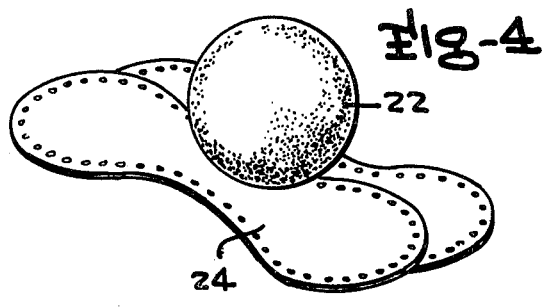
FIG. 4 is a perspective view illustrating separate components of an incompletely fabricated ball embodying the present invention.
Figure 5:
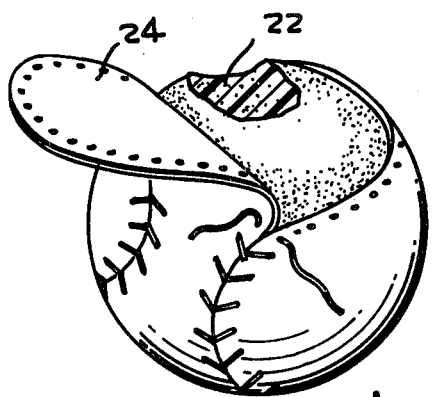
FIG. 5 is a perspective view illustrating a subsequent step in the assembly of the inventive ball with portions removed to illustrate the structure thereof.
Figure 6:
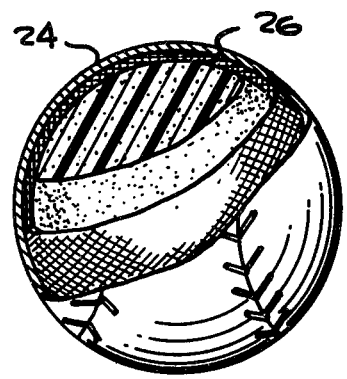
FIG. 6 is a perspective view of another embodiment of the inventive ball with portions removed to illustrate the internal construction of the ball.

The mold members 10 and 12 are employed for producing ball members as disclosed in FIGS. 4–6. Each of the ball members is formed with a spherical core portion 22 of polyurethane form having a diameter equal to at least 90% of the desired finished ball diameter. A cover 24 of horsehide or other material is sewn over and about the spherical core portion 22 with the cover normally being in a figure eight design as in the case with a regulation baseball or regulation softball. The core portion 22 can have the cover 24 directly applied about its exterior surface as when forming a softball as shown in FIG. 5 or an intermediate layer of cotton or other yarn 26 can optionally be provided over the surface of the spherical core member prior to the application of the cover 24 to provide a baseball as shown in FIG. 6 in which the thickness of the cotton layer is greatly exaggerated.

Figure 3:
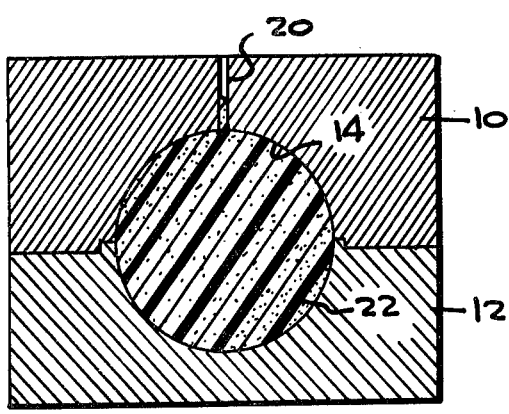
FIG. 3 is a sectional view taken along lines 3—3 of FIG. 2.

The core is fabricated by placing carefully measured amounts of polymeric isocyanate and a mixture of a catalyst and a blowing agent in the mold members so that the reaction of the constituents placed in the mold provides a resultant spherical core member as shown in FIG. 3. The blowing agent is water which reacts with the isocyanate to produce carbon dioxide gas to cause expansion and foaming of the mixture during polymerization. Normally, the water and the polyol catalyst are mixed together prior to mixing with the isocyanate. Consequently, the resulting ball weight and resilience can be controlled independently by controlling the ratio of the catalyst and blowing agent to the quantity of isocyanate so as to provide a spherical core which, when provided with a cover, duplicates the appearance dimension, weight, rebound and compression strength of a regulation baseball or a regulation softball as desired.

The manner in which the subject invention is practiced will be made more apparent by consideration of the following specific examples of methods employed in the fabrication of balls having different characteristics.

In a first example, commercially available isocyanate sold under the trademark FLEXIPOL and designated FP123 in its catalogue by Flexible Products Company of Marietta, Georgia was mixed in the mold with a mixture of catalyst and blowing agent (water) with the ratio of the isocyanate to the mixture of catalyst and blowing agent being 0.418. The total compound weight was 125 grams (4.41 ounces) and the mold was dimensioned to provide a core slightly less than regulation softball size. The components were permitted to cure in the mold for approximately ten minutes and the core was then removed and covered with an intermediate thin cotton yarn layer over which a cowhide cover was applied giving a total ball weight and size in conformity with Rule 3, Sec. 2 of the Official Softball Rules. The resultant ball had a rebound characteristic of 30% when dropped from a height of 20 feet onto a hard surface. In other words, the ball would bounce to a height of 6 feet equal to 30% of the 20 foot height from which it was dropped.

In a second example, commercially available isocyanate also sold under the trademark FLEXIPOL by Flexible Products Company but designated FP124A in its catalogue was mixed in the mold with a mixture of catalyst and blowing agent in a ratio of the isocyanate to the mixture of the catalyst and blowing agent of 0.396 with the total weight of the components being 125 grams. The core was slightly less than the finished size of the standard softball and the core was covered with cotton yarn and a cowhide cover with the resultant ball being of regulation softball size and having a rebound percentage of 23%. The isocyanate employed in this example has a shorter molecular length than does the isocyanate of the previous example.

In a third example, the components were the same as in the second example, but with the ratio of the isocyanate to the mixture of the catalyst and blowing agent being 0.375 and the resultant ball having a percent rebound of 21.5%.

In a fourth example, the constituents were exactly the same as in the second example and the ball was formed in exactly the same manner with the exception that the ratio of the isocyanate to the mixture of catalyst and blowing agent was 0.361. The resultant ball had a rebound percentage of 20.5%.

In all of the foregoing examples, the softball core had a circumference of 11.25 inches and a weight of 125 grams. The finished softball weighed approximately 182 grams and was within the weight and dimension ranges permitted by Rule 3, Sec. 2 of the Official Softball Rules.

By changing the catalyst and blowing agent from that of the first example to that of the second, third and fourth examples, the resiliency of the ball was reduced with no appreciable change in weight. Further changes in the resiliency were effected between the balls formed in the second, third and fourth examples by merely changing the ratio of the isocyanate to the mixture of the blowing agent and catalyst with the balls retaining the same weight. Consequently, it will be apparent that the increase in the amount of catalyst serves to reduce the resilience of the ball and vice versa. This is true because increased amounts of catalyst terminate the polymerization process more quickly than is the case with reduced quantities of catalyst so that the crosslinking of the polymers is reduced to consequently reduce the resilience.

Compression tests performed upon balls formed with the inventive cores indicate that the polyurethane core balls have a greater ability to recover from compression than do conventional cork core softballs. Moreover, the polyurethane core balls have a greater strength than do cork core balls which tend to crumble and crack after the core has been compressed by more than one-half their diameter. For example, a cork core ball will recover only 76% of its initial diameter after being subjected to maximum deflection while a polyurethane core ball will recover 93% of its initial diameter.

In a fifth example, a baseball was formed by mixing commercially available isocyanate sold under the trademark FLEXIPOL by Flexible Products Company designated FP123A in its catalogue with a mixture of catalyst and blowing agent sold under the trademark FLEXIPOLA and designated FP123B in said catalogue in a ratio of the isocyanate to the mixture of the catalyst and blowing agent of 0.377 with the total weight of the components being 122 grams (4.3 ounces). The mixture was at approximately 80° F. and was placed in a spherical mold having a circumference of 8.75". The core was slightly less than the finished size of a regulation baseball and was covered with a standard baseball cowhide cover with the resultant ball being of the size and weight (142 grams) of a regulation baseball and having a rebound percentage of 33%. The finished ball had a compression deflection of 0.70" when subjected to 1000 pounds of force. Consequently, the resultant ball was indistinguishable from a regulation baseball.

Additionally, while the foregoing examples have discussed the provision of a ball having a polyurethane core, it should be understood that a one-piece ball can be produced in the mold member with a stitch pattern being applied to the internal surface of the mold. In such cases, the mold will be maintained at 100° F. to 120° F. during the molding process for approximately 10 to 15 minutes. The mold will then be open and the ball removed to provide a completed ball in which the outer skin surface of the polyurethane constitutes the cover.

It should be understood that the spirit and scope of this invention is not limited to the specifically discussed examples, and is to be limited solely by the appended claims.

I claim:

1. A composite ball having the rebound, size, weight, appearance and physical characteristics and dimensions of a regulation baseball, said ball comprising a spherical core portion formed of flexible and resilient polyurethane foam and a cover portion enclosing said core, wherein said core portion is formed isocyanate and a mixture of catalyst and blowing agent in which the ratio of isocyanate to the mixture of catalyst and blowing agent is 0.377 with the total weight of the isocyanate and mixture of catalyst and blowing agent being 122 grams so as to provide a ball having essentially the same rebound qualities as a regulation baseball.

2. The invention of claim 1 wherein said cover portion comprises a leather member stitched over said core portion.

* * * * *